US009756655B2

United States Patent
Kim et al.

(10) Patent No.: US 9,756,655 B2
(45) Date of Patent: *Sep. 5, 2017

(54) METHOD AND APPARATUS FOR ACQUIRING AVAILABLE CHANNEL INFORMATION IN A WIRELESS LOCAL AREA NETWORK SYSTEM

(71) Applicant: LG ELECTRONICS INC., Seoul (KR)

(72) Inventors: Eun Sun Kim, Gyeonggi-do (KR); Yong Ho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 212 days.

This patent is subject to a terminal disclaimer.

(21) Appl. No.: 14/570,702

(22) Filed: Dec. 15, 2014

(65) Prior Publication Data

US 2015/0146709 A1 May 28, 2015

Related U.S. Application Data

(63) Continuation of application No. 14/074,276, filed on Nov. 7, 2013, now Pat. No. 9,049,686, which is a
(Continued)

(51) Int. Cl.
*H04L 12/28* (2006.01)
*H04W 74/00* (2009.01)
(Continued)

(52) U.S. Cl.
CPC ......... *H04W 74/002* (2013.01); *H04W 8/005* (2013.01); *H04W 16/14* (2013.01); *H04W 48/16* (2013.01)

(58) Field of Classification Search
CPC ... H04W 16/14; H04W 8/005; H04W 74/002; H04W 8/00; H04W 48/16
See application file for complete search history.

(56) References Cited

U.S. PATENT DOCUMENTS 5,276,908 A 1/1994 Koohgoli et al.
5,774,805 A 6/1998 Zicker
(Continued)

FOREIGN PATENT DOCUMENTS

CN 1221542 A 6/1999
CN 1561647 1/2005
(Continued)

OTHER PUBLICATIONS

USPTO Office Action dated Aug. 7, 2013 in related technology of U.S. Appl. No. 13/384,844.
(Continued)

*Primary Examiner* — Lakeram Jangbahadur
(74) *Attorney, Agent, or Firm* — Morgan, Lewis & Bockius LLP

(57) ABSTRACT

Methods and apparatuses for acquiring/providing available channel information using Generic Advertisement Service (GAS) protocol in a wireless local area network (WLAN) are disclosed. AP (Access Point) station has a capability to acquire information for available channels from a database using a specific protocol related to an operation within the White Space (e.g. Access Network Query Protocol (ANQP)). And, non-AP station can retrieve the information for available channels by transmitting a Generic Advertisement Service (GAS) initial request frame to the AP station, wherein the GAS initial request frame comprises an Advertisement Protocol Element whose element ID indicates the specific protocol, and receiving a GAS initial response frame comprising a White Space Map (WSM) the specific protocol. The WSM comprises one or more white space channel units, and each of the white space channel units comprises a channel number field indicating one of the available channels and a power constraint field indicating a maximum allowable power on the indicated channel.

10 Claims, 16 Drawing Sheets

Related U.S. Application Data continuation of application No. 13/051,562, filed on Mar. 18, 2011, now Pat. No. 8,583,129.

(60) Provisional application No. 61/383,346, filed on Sep. 16, 2010, provisional application No. 61/375,291, filed on Aug. 20, 2010, provisional application No. 61/351,945, filed on Jun. 7, 2010, provisional application No. 61/346,012, filed on May 18, 2010, provisional application No. 61/346,017, filed on May 18, 2010, provisional application No. 61/315,397, filed on Mar. 19, 2010.

(51) Int. Cl.
*H04W 16/14* (2009.01)
*H04W 8/00* (2009.01)
*H04W 48/16* (2009.01)

(56) References Cited

U.S. PATENT DOCUMENTS

| | | |
|---|---|---|
| 6,175,739 B1 | 1/2001 | Ishii et al. |
| 6,757,550 B1 | 6/2004 | Yoneyama et al. |
| 6,826,400 B1 | 11/2004 | Cashman et al. |
| 6,882,841 B1 | 4/2005 | Youn |
| 7,280,834 B2 | 10/2007 | Takarabe |
| 7,742,764 B2 | 6/2010 | Gillig et al. |
| 7,917,110 B2 | 3/2011 | Horiguchi et al. |
| 8,032,086 B2 | 10/2011 | Waltho et al. |
| 8,483,155 B1 | 7/2013 | Banerjea et al. |
| 8,583,129 B2 | 11/2013 | Kim et al. |
| 8,588,158 B2 | 11/2013 | Kim et al. |
| 8,588,160 B2 | 11/2013 | Kim et al. |
| 8,605,741 B2 | 12/2013 | Kim et al. |
| 8,792,466 B2 | 7/2014 | Kim et al. |
| 8,913,577 B2 | 12/2014 | Kim et al. |
| 2002/0027919 A1 | 3/2002 | Eneroth et al. |
| 2002/0154653 A1 | 10/2002 | Benveniste |
| 2003/0050012 A1 | 3/2003 | Black et al. |
| 2003/0093526 A1 | 5/2003 | Nandagopalan et al. |
| 2004/0151137 A1 | 8/2004 | McFarland et al. |
| 2005/0003827 A1 | 1/2005 | Whelan |
| 2005/0043047 A1 | 2/2005 | Vigier et al. |
| 2005/0063334 A1 | 3/2005 | Fnu et al. |
| 2005/0070279 A1 | 3/2005 | Ginzburg et al. |
| 2005/0169292 A1 | 8/2005 | Young |
| 2006/0034236 A1 | 2/2006 | Jeong |
| 2006/0062183 A1 | 3/2006 | Forte et al. |
| 2006/0067354 A1 | 3/2006 | Waltho et al. |
| 2006/0089964 A1 | 4/2006 | Pandey et al. |
| 2006/0218392 A1 | 9/2006 | Jonston |
| 2007/0014267 A1 | 1/2007 | Lam et al. |
| 2007/0047492 A1 | 3/2007 | Kim et al. |
| 2007/0192472 A1 | 8/2007 | Tokunaga et al. |
| 2007/0253394 A1 | 11/2007 | Horiguchi et al. |
| 2008/0025282 A1 | 1/2008 | Hong |
| 2008/0130519 A1 | 6/2008 | Bahl et al. |
| 2008/0151796 A1 | 6/2008 | Jokela |
| 2008/0165754 A1 | 7/2008 | Hu |
| 2008/0171552 A1 | 7/2008 | Hyon et al. |
| 2008/0240024 A1 | 10/2008 | Rao et al. |
| 2008/0268832 A1 | 10/2008 | Peng |
| 2008/0298333 A1 | 12/2008 | Seok |
| 2009/0010399 A1* | 1/2009 | Kim ............... H04L 12/2856 379/45 |
| 2009/0061783 A1 | 3/2009 | Choi et al. |
| 2009/0111463 A1 | 4/2009 | Simms et al. |
| 2009/0158282 A1 | 6/2009 | Blaisdell et al. |
| 2009/0171930 A1 | 7/2009 | Vaughan et al. |
| 2009/0191906 A1 | 7/2009 | Abedi |
| 2009/0196180 A1 | 8/2009 | Bahl et al. |
| 2009/0197627 A1 | 8/2009 | Kuffner et al. |
| 2009/0207800 A1 | 8/2009 | Shan et al. |
| 2009/0217333 A1 | 8/2009 | Young et al. |
| 2009/0268674 A1 | 10/2009 | Liu et al. |
| 2009/0270079 A1 | 10/2009 | Han et al. |
| 2009/0280748 A1 | 11/2009 | Shan et al. |
| 2009/0298522 A1* | 12/2009 | Chaudhri ............. H04W 16/14 455/509 |
| 2009/0323835 A1 | 12/2009 | Rao et al. |
| 2009/0325499 A1 | 12/2009 | Corke et al. |
| 2010/0008285 A1 | 1/2010 | Kuroda |
| 2010/0030907 A1 | 2/2010 | Pollak |
| 2010/0034160 A1 | 2/2010 | Prakash et al. |
| 2010/0048234 A1 | 2/2010 | Singh |
| 2010/0061299 A1 | 3/2010 | Kennedy et al. |
| 2010/0069013 A1 | 3/2010 | Chaudhri et al. |
| 2010/0081449 A1 | 4/2010 | Chaudhri et al. |
| 2010/0091712 A1 | 4/2010 | Lu et al. |
| 2010/0111235 A1 | 5/2010 | Zeng et al. |
| 2010/0124254 A1 | 5/2010 | Wu et al. |
| 2010/0142458 A1 | 6/2010 | Mark |
| 2010/0175101 A1 | 7/2010 | Devictor et al. |
| 2010/0177756 A1 | 7/2010 | Choi et al. |
| 2010/0195580 A1 | 8/2010 | Samarasooriya et al. |
| 2010/0195590 A1 | 8/2010 | Park |
| 2010/0195667 A1 | 8/2010 | Wang et al. |
| 2010/0220687 A1 | 9/2010 | Reznik et al. |
| 2010/0229205 A1 | 9/2010 | Hakusui |
| 2010/0232372 A1 | 9/2010 | Jakllari et al. |
| 2010/0246434 A1 | 9/2010 | Wang et al. |
| 2010/0246506 A1 | 9/2010 | Krishnaswamy |
| 2010/0303026 A1 | 12/2010 | Chaudhri et al. |
| 2010/0303051 A1 | 12/2010 | Umeuchi et al. |
| 2010/0309317 A1 | 12/2010 | Wu et al. |
| 2010/0309806 A1 | 12/2010 | Wu et al. |
| 2011/0019649 A1 | 1/2011 | Dayal et al. |
| 2011/0043710 A1 | 2/2011 | Samarasooriya et al. |
| 2011/0045781 A1 | 2/2011 | Shellhammer et al. |
| 2011/0090887 A1 | 4/2011 | Kim et al. |
| 2011/0090890 A1 | 4/2011 | Seok et al. |
| 2011/0091393 A1 | 4/2011 | Simmonds et al. |
| 2011/0116458 A1 | 5/2011 | Hsu et al. |
| 2011/0122855 A1 | 5/2011 | Henry |
| 2011/0164581 A1 | 7/2011 | Keon |
| 2011/0195667 A1 | 8/2011 | Hassan et al. |
| 2011/0222488 A1 | 9/2011 | Kim et al. |
| 2011/0243078 A1 | 10/2011 | Kim et al. |
| 2011/0280228 A1* | 11/2011 | McCann .............. H04W 48/14 370/338 |
| 2011/0286405 A1 | 11/2011 | Kim et al. |
| 2011/0287802 A1 | 11/2011 | Ma et al. |
| 2012/0026941 A1 | 2/2012 | Ahmad et al. |
| 2012/0063364 A1 | 3/2012 | Emmelmann et al. |
| 2012/0096492 A1 | 4/2012 | Urban et al. |
| 2012/0096498 A1 | 4/2012 | Wu et al. |
| 2012/0120904 A1 | 5/2012 | Seok et al. |
| 2012/0165056 A1 | 6/2012 | Kim et al. |
| 2012/0170534 A1 | 7/2012 | Kim et al. |
| 2012/0208558 A1 | 8/2012 | Bajko et al. |
| 2012/0218956 A1 | 8/2012 | Kim et al. |
| 2012/0315855 A1 | 12/2012 | Li et al. |
| 2013/0103684 A1 | 4/2013 | Yee et al. |
| 2013/0114586 A1 | 5/2013 | Kim et al. |
| 2013/0142132 A1 | 6/2013 | Kim et al. |
| 2014/0113649 A1 | 4/2014 | Bajko et al. |

FOREIGN PATENT DOCUMENTS

| | | |
|---|---|---|
| CN | 1745528 A | 3/2006 |
| CN | 101006683 A | 7/2007 |
| CN | 101242333 A | 8/2008 |
| JP | 2000-504163 A | 4/2000 |
| JP | 2004-286460 A | 10/2004 |
| JP | 2007-043391 A | 2/2007 |
| JP | 2007-184850 A | 7/2007 |
| JP | 2007300419 A | 11/2007 |
| JP | 2008-278456 A | 11/2008 |
| JP | 2009-200582 A | 9/2009 |
| JP | 2009-224881 A | 10/2009 |
| JP | 2013-520938 A | 6/2013 |
| JP | 2013-530608 A | 7/2013 |
| JP | 2013-535853 A | 9/2013 |

(56) References Cited

FOREIGN PATENT DOCUMENTS

| KR | 2009-0021865 | | 3/2009 |
|---|---|---|---|
| WO | 2006/117587 | | 11/2006 |
| WO | 2009/016800 | A2 | 2/2009 |
| WO | 2009/031825 | A2 | 3/2009 |
| WO | 2009/061779 | A1 | 5/2009 |
| WO | 2009/069068 | A2 | 6/2009 |
| WO | 2009/104336 | A1 | 8/2009 |
| WO | 2009/136760 | A1 | 11/2009 |

OTHER PUBLICATIONS

Chen Sun et al., Enabling Procedure of Communication in TVWS under FCC rules, IEEE 802.11-10/261r0, Feb. 2010.
U.S. Notice of Allowance (U.S. Appl. No. 12/910,186), dated Jul. 12, 2013.
Office Action dated Jun. 25, 2014, issued by the U.S. Patent and Trademark Office in U.S. Appl. No. 12/908,449.
Notice of Allowance dated Apr. 25, 2014, issued by the U.S. Patent & Trademark Office in U.S. Appl. No. 12/993,409.
Canadian Office Action dated Feb. 3, 2014, issued in Canadian Patent Application No. 2773660.
Office Action dated Dec. 18, 2014, issued by the U.S. Patent and Trademark Office in U.S. Appl. No. 14/288,559.
Office Action dated Dec. 19, 2014, issued by the U.S. Patent and Trademark Office in U.S. Appl. No. 14/052,603.
Notice of Allowance dated Sep. 29, 2015, issued by the U.S. Patent and Trademark Office in U.S. Appl. No. 14/547,991.
Cordeiro et al., "IEEE 802.22: An introduction to the first wireless standard based on gognitive radios", IEEE Journal of communications, vol. 1, No. 1, pp. 38-47, Apr. 2006.
Challapali et al., "Spectrum agile radio: detecting spectrum opportunities", ISART, Boulder, Colorado, Mar. 2-4, 2004.
Sturza et al. "White Spaces Engineering Study: can cognitive radio technology operating in the TV white spaces completely protect licensed TN broadcasting?" New America Foundation Wireless Future Program, working paper No. 16, Jan. 2007.
Bahl et al. "White Space Networking with Wi-Fi like Connectivity," ACM SIGCOMM 2009, Aug. 17, 2009.
Pagadarai et al. "Wireless Spectrum Characterisation and Dynamic Utilization in Vehicular Communication Networks," Final Report, Wireless Innovation Laboratory, Worcester Polytechnic Institute, Sep. 30, 2009.
Wei et al. "Two-Hop-Relay Architecture for Next-Generation WWAN/WLAN Integration," IEEE Wireless Communications, Apr. 2004, pp. 2-9.
Singh et al. "PAMAS—Power Aware Multi-Access Protocol with Signalling for Ad Hoc Networks," Computer Communication Review, vol. 28, Issue 3, Jul. 1998, pp. 5-26.
Juha Ala Laurila et al. "Wireless LAN Access Network Architecture for Mobile Operators," Computer Communication Review, IEEE Communications Magazine, Nov. 2001, pp. 82-89.
Han et al., "Introduction of Cognitive Radio Network, KIISE Information Review", vol. 22, No. 2, pp. 1-16, Nov. 2008.
Mangold et al., "Spectrum agile radio: radio resource measurements for opport unities spectrum usage", IEEE Global telecommunications conference Nov. 29, 2004-Dec. 1, 2004, vol. 6, pp. 3467-3471, Nov. 2004.
PCT International Search Report for Application No. PCT/KR2010/007076 dated Jun. 24, 2011.
PCT International Search Report for Application No. PCT/KR2010/06955 dated Jun. 24, 2011.
PCT International Search Report for Application No. PCT/KR2011/002276 dated Dec. 28, 2011.
PCT International Search Report for Application No. PCT/KR2010/008976 dated Aug. 22, 2011.
PCT International Search Report for Application No. PCT/KR2009/006103 dated Sep. 10, 2010.
PCT International Search Report for Application No. PCT/KR2009/06104 dated Sep. 30, 2010.
PCT International Search Report for Application No. PCT/KR2010/007011 dated Jun. 21, 2011.
PCT International Search Report for Application No. PCT/KR2010/006954 dated Jun. 24, 2011.
Office Action from corresponding U.S. Appl. No. 12/993,409 dated Jan. 4, 2012.
USPTO Office Action dated Sep. 5, 2013 in related technology U.S. Appl. No. 12/908,449.
Office Action issued in related technology U.S. Appl. No. 12/993,409 mailed Jul. 3, 2012.
N.Srivastava, et al., Expanding Wireless Communication "White Space", White Paper of Dell Inc., Oct. 2008.
C.R. Stevenson, et al., "IEEE 802.22: The First Cognitive Radio Wireless Regional Area Network Standard", IEEE Communications Magazine, Jan. 2009, pp. 130-138.
International Search Report for PCT/KR2010/001885 dated Oct. 26, 2011.
Notice of Allowance dated Oct. 29, 2014, issued by the U.S. Patent and Trademark Office in U.S. Appl. No. 12/908,449.
Office Action dated Jul. 3, 2014, issued by the State Intellectual Property Office of China in Chinese Patent Application No. 201080065374.1.
Office Action dated Jun. 27, 2014, issued by the State Intellectual Property Office of China in Chinese Patent Application No. 201080065876.4.
Office Action dated Apr. 1, 2014, issued by the State Intellectual Property Office of China in Chinese Patent Application No. 201080058187.0.
Office Action dated Nov. 26, 2014, issued by the State Intellectual Property Office in Chinese Patent Application No. 201180038039.7.
Office Action dated Sep. 25, 2015, issued by the U.S. Patent and Trademark Office in U.S. Appl. No. 14/617,905.
Nekovee, Maziar, "A Survey of Cognitive Radio Access to TV White Spaces," Ultra Modern Telecommunications & Workshops, ICUMT'09, International Conference on, Oct. 12, 2009, pp. 1-8.
Office Action dated Mar. 7, 2014, issued by the U.S. Patent & Trademark Office in U.S. Appl. No. 12/908,449.
Office Action issued in related U.S. Appl. No. 13/046,048 dated Dec. 7, 2012.
Office Action issued in related U.S. Appl. No. 12/910,186 dated Dec. 6, 2012.
Notice of Allowance issued in related U.S. Appl. No. 13/096,289 dated Dec. 10, 2012.
Nan Hao, et al., Short-Range WLAN Compatible Hybrid Cognitive Radio Networks System and MAC Protocol, Communication Software and Networks, 2009, ICCSN 2009 International Conference on Communication Software and Networks, IEEE, Feb. 28, 2009, pp. 81-86.
U.S. Appl. No. 13/030,654—Office Action—Issued on Feb. 12, 2013.
Chinese Office Action dated Dec. 23, 2013, issued in Chinese Patent Application No. 200980161376.8.
U.S. Office Action dated Jan. 6, 2014, issued in U.S. Appl. No. 12/993,409.
Ha Nguyen Tran et al., "Requirements and Amendment Regarding TVWS Database Access," IEEE 802.11-10/0262r1, IEEE mentor, Mar. 17, 2010.
Necati Canpolat et al., "TGu Single GAS Protocol," IEEE 802.11-10/0266r49, IEEE mentor, Mar. 18, 2010.
Eunsun Kim et al., "Normative Text for Scanning in TV Whitespaces," IEEE 802.11-10/0472r2, IEEE mentor, May 11, 2010.
Shkumbin Hamiti, Nokia, SDD editor, IEEE 802.16m System Description Document [Draft], IEEE 802.16m-08/003r8, IEEE, Apr. 10, 2009.

* cited by examiner

| Category | Action Value | Dialog Token | Regulatory Class |
|---|---|---|---|

Octets: 1    1    1    variable

| Category | Action Value | Dialog Token | White Space Map |
|---|---|---|---|

Octets: 1    1    1    variable

Figure 14

| Element ID | Length | Advertisement Protocol Tuple #1 | Advertisement Protocol Tuple #2 (optional) | ... | Advertisement Protocol Tuple #n (optional) |
|---|---|---|---|---|---|
| Octets: 1 | 1 | Variable | Variable | | Variable |

Figure 15

| B0 - B6 | B7 | |
|---|---|---|
| Query Response Length Limit | PAME-BI | Advertisement Protocol ID |
| Octets: 1 | | Variable |

| Name | Value |
|---|---|
| Access Network Query Protocol | 0 |
| MIH Information Service | 1 |
| MIH Command and Event Service Capability Discovery | 2 |
| Emergency Alert System (EAS) | 3 |
| Location-to-Service Translation Protocol | 4 |
| Reserved | 5-220 |
| Vendor Specific | 221 |
| Reserved | 222-255 |

Octets:        2           2         variable

Octets: 2     2     variable

Figure 19

| Information ID | Length | Location (Optional) | Regulatory Database Address (Optional) | Regulatory Access Time (Optional) | Device Identification Information |
|---|---|---|---|---|---|
| 2 | 2 | Variable | Variable | Variable | variable |

Octets:

Figure 20

| Information ID | Length | WSM information element |
|---|---|---|
| 2 | 2 | variable |

Octets:

Figure 21

| Element ID | Length | TV band database access time | White Space Channel Unit #1 | White Space Channel Unit #2 | ... | White Space Channel Unit #n |
|---|---|---|---|---|---|---|
| 1 | 1 | 8 | 2 | 2 | | 2 |

Octets:

Figure 22

| Channel Number | Power Constraint |
|---|---|
| 1 | 1 |

Octets:

METHOD AND APPARATUS FOR ACQUIRING AVAILABLE CHANNEL INFORMATION IN A WIRELESS LOCAL AREA NETWORK SYSTEM

CROSS REFERENCE TO RELATED APPLICATIONS

The present application is a continuation of U.S. patent application Ser. No. 14/074,276, filed on Nov. 7, 2013, issued as U.S. Pat. No. 9,049,686 on Jun. 2, 2015, which is a continuation of U.S. patent application Ser. No. 13/051,562 (now U.S. Pat. No. 8,583,129), filed on Mar. 18, 2011, which claims the benefit of U.S. Provisional Applications No. 61/315,397, filed on Mar. 19, 2010, No. 61/346,017, filed on May 18, 2010, No. 61/346,012, filed on May 18, 2010, No. 61/351,945, filed on Jun. 7, 2010, No. 61/375,291, filed on Aug. 20, 2010, and No. 61/383,346, filed on Sep. 16, 2010, the entire disclosure of each of which is hereby incorporated by reference for all purposes as if fully set forth herein.

BACKGROUND OF THE INVENTION

Field of the Invention

The present invention relates to a wireless local area network (WLAN), and more particularly, to methods and apparatuses for acquiring/providing available channel information in a wireless local area network (WLAN).

Discussion of the Related Art

The standard for a Wireless Local Area Network (WLAN) technology is established by IEEE 802.11 standard association. IEEE 802.11a/b among IEEE 802.11 standards provides 11 Mbps (IEEE 802.11b) or 54 Mbps (IEEE 802.11a) transmission efficiency using unlicensed band on 2.4. GHz or 5 GHz frequency band. IEEE 802.11g, adapting OFDM (Orthogonal Frequency Divisional Multiplexing) technology, provides 54 Mbps transmission efficiency. And, IEEE 802.11n, adapting MIMO-OFDM technology, provides 300 Mbps transmission efficiency for 4 spatial streams. IEEE 802.11n provides 40 MHz channel bandwidth, and in this case it provides up to 600 Mbps transmission efficiency.

Now, a standard for regulating the WLAN operation in TV White Space is under establishment, as IEEE 802.11af.

TV Whitespace includes channels allocated to broadcast TV, which are permitted to be used by cognitive radio device. TV White Space may include UHF band and VHF band. The spectrum not used by a licensed device (hereinafter, can be called as 'White Space') can be used by an unlicensed device. The frequency band permitted to be used by unlicensed device can be differently defined for each country. Generally, this frequency band comprises 54-698 MHz (US, Korea), and some of this frequency band can't be used for the unlicensed device. Here, 'licensed device' means a device of the user permitted in this frequency band, and can be differently called as 'primary user', or 'incumbent user'. Hereinafter, the term of 'incumbent user' can be collectively used for these terms.

Unlicensed device should provide a protection mechanism for the incumbent user. That is, the unlicensed device should stop using a specific channel, when an incumbent user, such as wireless microphone, is using that specific channel. For this purpose, spectrum sensing mechanism is required. Spectrum sensing mechanism comprises Energy Detection scheme, Feature Detection scheme, etc. By using this mechanism, unlicensed device determines that the channel is used by an incumbent user, when the strength of the primary signal is greater than a predetermined level, or when DTV (Digital Television) Preamble is detected. And, the unlicensed device (station or Access Point) shall lower its transmission power, when it is detected that the neighboring channel, next to the channel used by the unlicensed device, is used by the incumbent user.

Further, the unlicensed device should search for a network to be connected in a specific channel in TVWS. As stated above, the unlicensed device is permitted to operate only within available channels not used by the incumbent user.

For these purpose, the unlicensed device, which wishes to use the TV White Space (TVWS), shall acquire information for available channel list at its location. However, individual sensing mechanism takes significant time and consume huge amount of power, thus it is needed for the unlicensed device to acquire the available channel information more effectively.

SUMMARY OF THE INVENTION

Technical Problem

One aspect of the present invention is for providing a method and an apparatus for effectively acquiring available channel information from a TV band database. Some examples for this aspect are for acquiring available channel information as a White Space Map (WSM) from a station which can access a regulatory database. Some examples for this aspect are for effectively acquiring WSM using Generic Advertisement Service (GAS) protocol.

The object of the present invention is not limited the above stated objects, but includes various objects recited or apparent in/from the detailed description of the present invention.

Technical Solution

One aspect of the present invention provides a method for a non-AP (Access Point) station, operating as an unlicensed device in a White Space where the unlicensed device is permitted to operate within available channels not used by a licensed device, to retrieve information for the available channels from an AP station. The method comprises: transmitting a request frame to the AP station, wherein the request frame comprises an identifier indicating a specific protocol related to an operation within the White Space, wherein the AP station has a capability to acquire the information for the available channels from a database using the specific protocol; and receiving a response frame comprising a White Space Map (WSM) using the specific protocol from the AP station, wherein the WSM comprises the information for the available channels, wherein the WSM comprises frequency information for the available channels.

The WSM may comprises one or more white space channel units, and each of the white space channel units comprises a channel number field indicating one of the available channels and a power constraint field indicating a maximum allowable power on the indicated channel.

The request frame may comprise a probe request frame, and the response frame may comprise a probe response frame.

In the other hand, the request frame may comprise a Generic Advertisement Service (GAS) initial request frame, and the response frame may comprise a GAS initial response frame. In this case, the GAS initial request frame may comprise an Advertisement Protocol Element whose element ID indicates the specific protocol.

The specific protocol may comprise Access Network Query Protocol (ANQP). In this case, the GAS initial request frame may further comprise an ANQP element whose information ID indicates a TV White Space (TVWS) access element. The GAS initial response frame may further comprise an ANQP element whose information ID indicates a TV White Space (TVWS) access element. Specifically, the TVWS access element in the GAS initial response frame may comprise: and a database access time field indicating when the AP station accessed the database to get the WSM; and one or more white space channel units corresponding to the WSM.

The GAS initial response frame may further comprise information on a location of the AP station, and information on a coverage within which the WSM is valid.

Another aspect of the present invention provides a non-AP (Access Point) station, operating as an unlicensed device in a White Space where the unlicensed device is permitted to operate within available channels not used by a licensed device, for receiving information for the available channels from an AP station. The non-AP station comprises: a transmitter configured for transmitting a request frame to the AP station, wherein the request frame comprises an identifier indicating a specific protocol related to an operation within the White Space, wherein the AP station has a capability to acquire the information for the available channels from a database using the specific protocol; and a receiver configured for receiving a response frame comprising a White Space Map (WSM) from the AP station using the specific protocol, wherein the WSM comprises the information for the available channels, wherein the WSM comprises frequency information for the available channels.

The WSM may comprises one or more white space channel units, and each of the white space channel units comprises a channel number field indicating one of the available channels and a power constraint field indicating a maximum allowable power on the indicated channel.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 14 shows a transmission mechanism of White Space Map announcement Frame between STAs according to one aspect of the present invention, FIGS. 15 and 16 show an example of the Advertisement Protocol Information Element format and Advertisement Protocol Tuplet format within the Advertisement Protocol Information Element format, FIG. 17 shows an example of Advertisement Protocol IDs, FIG. 19 shows an example of TVWS Access format, FIG. 20 shows an example of TVWS Protocol frame to be used for requesting the WSM to the TV band database, FIG. 21 shows the TV band response frame returned in response to the TV Band Database Request, FIG. 22 shows an example of a format for a White Space Channel Unit of the TV band database response frame.

DETAILED DESCRIPTION OF THE INVENTION

Reference will now be made in detail to the embodiments of the present invention, examples of which are illustrated with the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart.

First of all, Wireless Local Area Network (WLAN) system in which embodiments of the present invention can be applied is explained.

Figure 1:
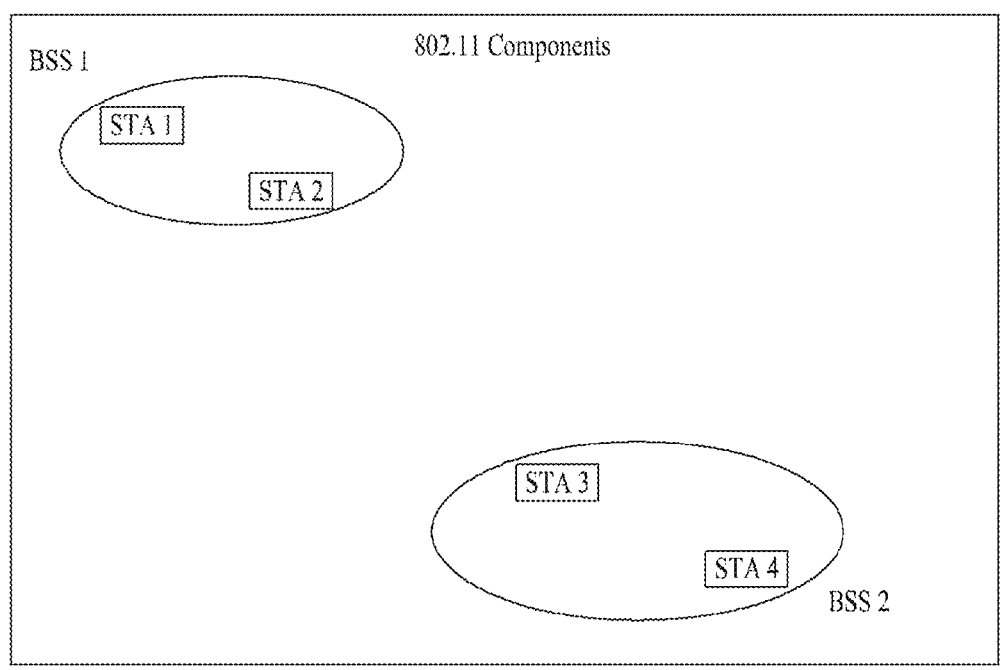
FIG. 1 shows an exemplary architecture of IEEE 802.11 system.

FIG. 1 shows an exemplary architecture of IEEE 802.11 system.

The IEEE 802.11 architecture consists of several components that interact to provide a WLAN that supports STA (station) mobility transparently to upper layers. The basic service set (BSS) is the basic building block of an IEEE 802.11 LAN. FIG. 1 shows two BSSs, each of which has two STAs that are members of the BSS. It is useful to think of the ovals used to depict a BSS as the coverage area within which the member STAs of the BSS may remain in communication. (The concept of area, while not precise, is often good enough.) This area is called the Basic Service Area (BSA). If a STA moves out of its BSA, it can no longer directly communicate with other STAs present in the BSA.

The independent BSS (IBSS) is the most basic type of IEEE 802.11 LAN. A minimum IEEE 802.11 LAN may consist of only two STAs. Since the BSSs shown in FIG. 1 are simple and lack other components (contrast this with FIG. 2), the two can be taken to be representative of two IBSSs. This mode of operation is possible when IEEE 802.11 STAs are able to communicate directly. Because this type of IEEE 802.11 LAN is often formed without pre-planning, for only as long as the LAN is needed, this type of operation is often referred to as an ad hoc network.

A STA's membership in a BSS is dynamic (STAs turn on, turn off, come within range, and go out of range). To become a member of a BSS, a STA joins the BSS using the synchronization procedure. To access all the services of an infrastructure BSS, a STA shall become "associated." These associations are dynamic and involve the use of the distribution system service (DSS).

Figure 2:
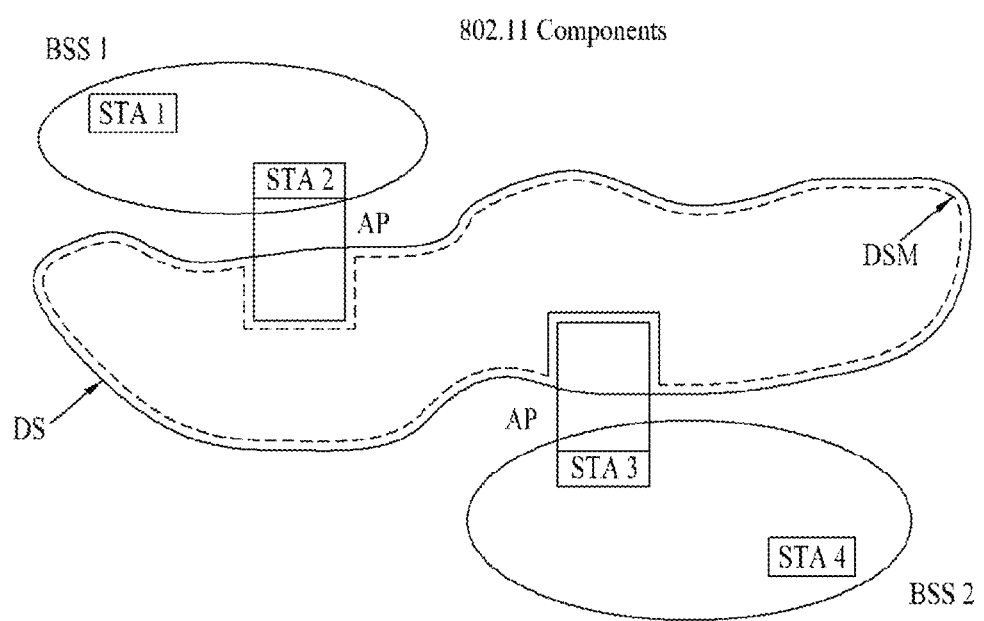
FIG. 2 is another exemplary architecture of IEEE 802.11 system in which the DS, DSM and AP components are added to the IEEE 802.11 architecture picture.

FIG. 2 is another exemplary architecture of IEEE 802.11 system in which the DS, DSM and AP components are added to the IEEE 802.11 architecture picture.

PHY limitations determine the direct station-to-station distance that may be supported. For some networks, this distance is sufficient; for other networks, increased coverage is required. Instead of existing independently, a BSS may also form a component of an extended form of network that is built with multiple BSSs. The architectural component used to interconnect BSSs is the DS (Distribution System).

IEEE Std 802.11 logically separates the WM (wireless Medium) from the distribution system medium (DSM). Each logical medium is used for different purposes, by a different component of the architecture. The IEEE 802.11 definitions neither preclude, nor demand, that the multiple media be either the same or different.

Recognizing that the multiple media are logically different is the key to understanding the flexibility of the architecture. The IEEE 802.11 LAN architecture is specified independently of the physical characteristics of any specific implementation.

The DS enables mobile device support by providing the logical services necessary to handle address to destination mapping and seamless integration of multiple BSSs.

An access point (AP) is any entity that has STA functionality and enables access to the DS, via the WM for associated STAs.

Data move between a BSS and the DS via an AP. Note that all APs are also STAs; thus they are addressable entities. The addresses used by an AP for communication on the WM and on the DSM are not necessarily the same.

Data sent to the AP's STA address by one of the STAs associated with it are always received at the uncontrolled port for processing by the IEEE 802.1X port access entity. In addition, if the controlled port is authorized, these frames conceptually transit the DS.

Hereinafter, Extended Service Set (ESS) for a large coverage network is explained.

Figure 3:
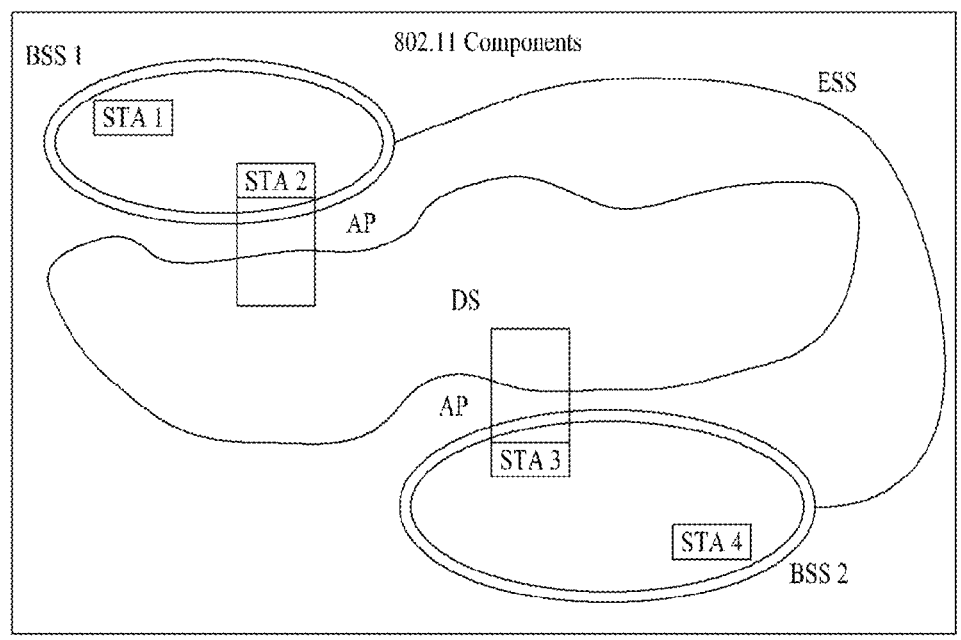
FIG. 3 shows another exemplary architecture of IEEE 802.11 system for explaining the concept of ESS.

FIG. 3 shows another exemplary architecture of IEEE 802.11 system for explaining the concept of ESS.

The DS and BSSs allow IEEE Std 802.11 to create a wireless network of arbitrary size and complexity. IEEE Std 802.11 refers to this type of network as the ESS network. An ESS is the union of the BSSs connected by a DS. The ESS does not include the DS. The key concept is that the ESS network appears the same to an LLC (logical link control) layer as an IBSS network. STAs within an ESS may communicate and mobile STAs may move from one BSS to another (within the same ESS) transparently to LLC.

Nothing is assumed by IEEE Std 802.11 about the relative physical locations of the BSSs in FIG. 3. All of the following are possible:

The BSSs may partially overlap. This is commonly used to arrange contiguous coverage within a physical volume.

The BSSs could be physically disjoint. Logically there is no limit to the distance between BSSs.

The BSSs may be physically collocated. This may be done to provide redundancy.

One (or more) IBSS or ESS networks may be physically present in the same space as one (or more) ESS networks. This may arise for a number of reasons. Some examples are when an ad hoc network is operating in a location that also has an ESS network, when physically overlapping IEEE 802.11 networks have been set up by different organizations, and when two or more different access and security policies are needed in the same location.

Figure 4:
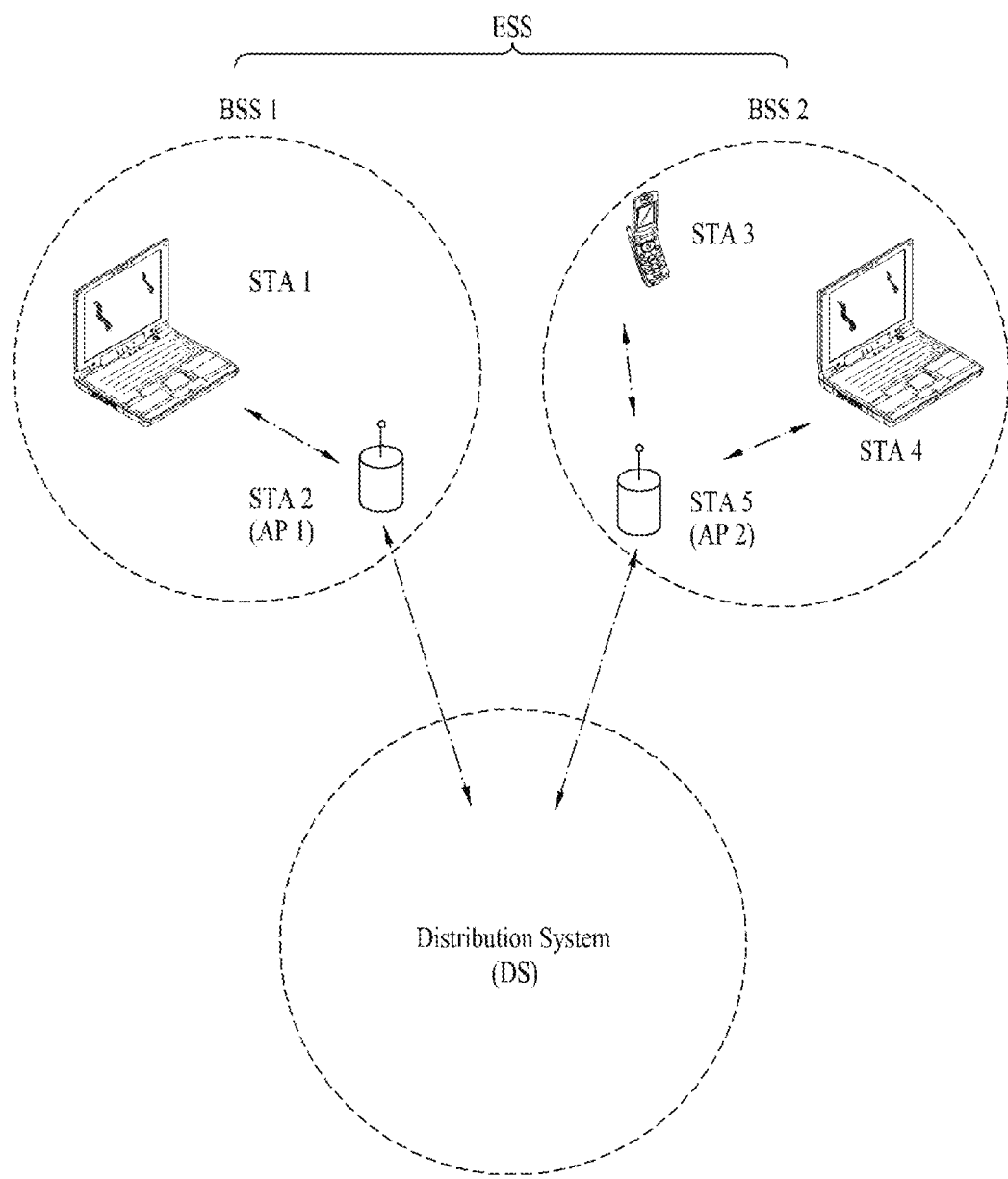
FIG. 4 shows exemplary system architecture for better understanding the WLAN system.

FIG. 4 shows exemplary system architecture for better understanding the WLAN system.

As can be understood, FIG. 4 is an example of infrastructure BSS including DS. And BSS 1 and BSS 2 consist of ESS. In WLAN system, a STA is a device operating according to MAC/PHY regulation of IEEE 802.11, and includes an AP STA and non-AP STA, such a laptop computer, mobile phone, etc. Usually, the device which a user directly handles is non-AP STA. Hereinafter, non-AP STA can be differently called as (terminal), WTRU (Wireless Transmit/Receive Unit), User Equipment (UE), Mobile Station (MS), Mobile Terminal, Mobile Subscriber Unit, etc. AP can corresponds to Base Station (BS), Node-B, BTS (Base Transceiver System), or Femto BS in another field of wireless communication.

Hereinafter, one example for a mechanism to acquire available channel information from a regulatory database is explained. This mechanism is related to a mechanism in which the unlicensed device efficiently finds the network to be connected.

In order to operate in TVWS as an unlicensed device, a STA should find the network to be connected. This type of process may be called as 'scanning'. If we assume that the channel bandwidth used for by the IEEE 802.11 TVWS protocol in TVWS is the same as the channel bandwidth used by Digital TV (DTV), the channel bandwidth of each channel shall be 6 MHz. For IEEE 802.11 operation in 2.4 GHz and 5 GHz, the channel bandwidth is 20 MHz. This means that there are a lot more channels to be scanned by a STA in TVWS than the channels in 2.4 GHz and/or 5 GHz. This can significantly increase the scanning time and power consumption for a STA to find the network to be connected.

Also, in order to operate in TVWS as an unlicensed device, a STA should have a mechanism for protecting the incumbent user. The most casual approach to find the available channel in TVWS is performing, at the STA, 'sensing' to find whether there is an incumbent user operates on a specific channel. (It should be noted that the term 'sensing' is for finding whether there is a primary signal on a specific channel, that is, for finding the available channel, while the term 'scanning' is for finding the network to be connected.) Another approach is accessing the external regulatory domain database (DB) to find the available channel list in TVWS. For the TVWS, the external regulatory DB can be TV band database. The DB can include information for scheduling of licensed users at a specific geographic location. Therefore, one example of the present invention proposes an AP STA (an enabling STA) to access via internet to the regulatory domain database and acquire the available channel list at its own geographic location, and to deliver this available channel lists to other STAs, rather than each of the STAs perform sensing every channels to find whether they are available or not. In this document, information for the available channel list from the regulatory domain database may be called as 'White Space Map (WSM)'.

It should be noted that available channels in TVWS are different from each other based on a geographical location. Therefore, it is preferable for the AP STA which providing the WSM to other STAs to incorporate its own location information in the WSM. For this, the AP STA according to this example should have GPS receiver or the equivalent to acquire its own geographical location information. This location information may include information for latitude, longitude, and altitude in a form of (x, y, z).

Further, it is possible that the received WSM, received from the AP STA by a specific STA, is not valid, when the distance between the AP STA and the specific STA is very far. Therefore, it is preferable for the AP STA to incorporate coverage information in the WSM. This coverage information can be used as a parameter indicating how far the received WSM is valid from the location of the AP STA.

As explained here, if a STA acquires the available channel list to operate in TVWS as the WSM, the STA need not perform scanning on a channel identified as not available by WSM. Therefore, acquiring the WSM from DB and delivering this WSM can efficiently reduce the scanning time and power consumption.

Here, one example of the present invention proposes the WSM indicating the list of available channels with the first channel granularity, while the second channel granularity is used for the WLAN operation. This is explained with regards to FIGS. 5-8.

Figure 5:
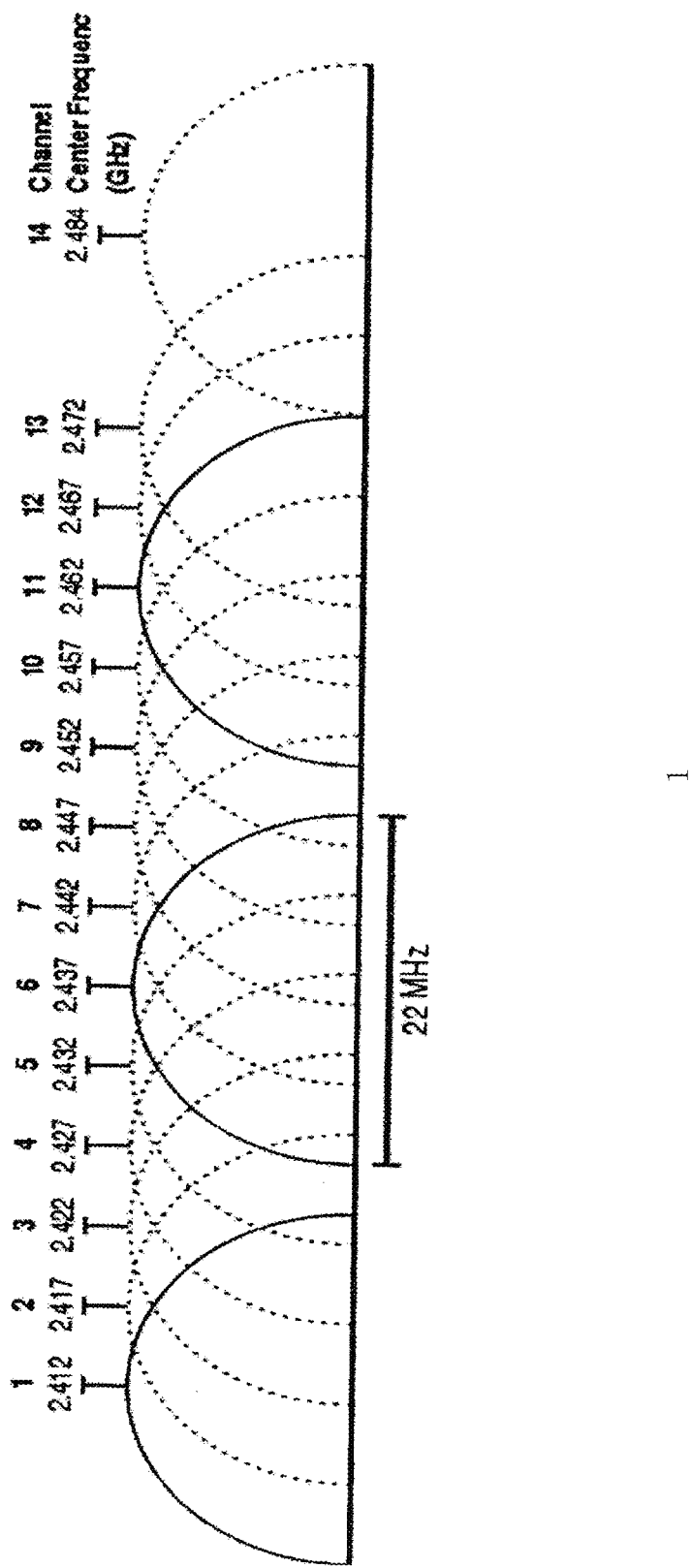
FIG. 5 shows channels defined in 2.4 GHz band for WLAN operation.

FIG. 5 shows channels defined in 2.4 GHz band for WLAN operation.

As shown in FIG. 5, there are 14 channels for WLAN operation in 2.4 GHz band. Each of the channels has center frequency at 2.412, 2.417, 2.422, . . . , 2.472 GHz. And, orthogonal channels which do not overlap each other are used for WLAN operation. In FIG. 5, channels 1, 6 and 11 can be used for WLAN operation. FIG. 5 shows each channel span over 22 MHz, however it is actually 20 MHz used for WLAN operation. (20 MHz channel granularity)

Depending on the country, the channels used for WLAN operation can be different. For example, channels 1-11 are used for WLAN operation in North America. Example shown in FIG. 5 is for 20 MHz channel granularity for WLAN operation. However, IEEE 802.11 PHY can use 5, 10, 20 and 40 MHz granularity using deferent sample rates.

Figure 6:
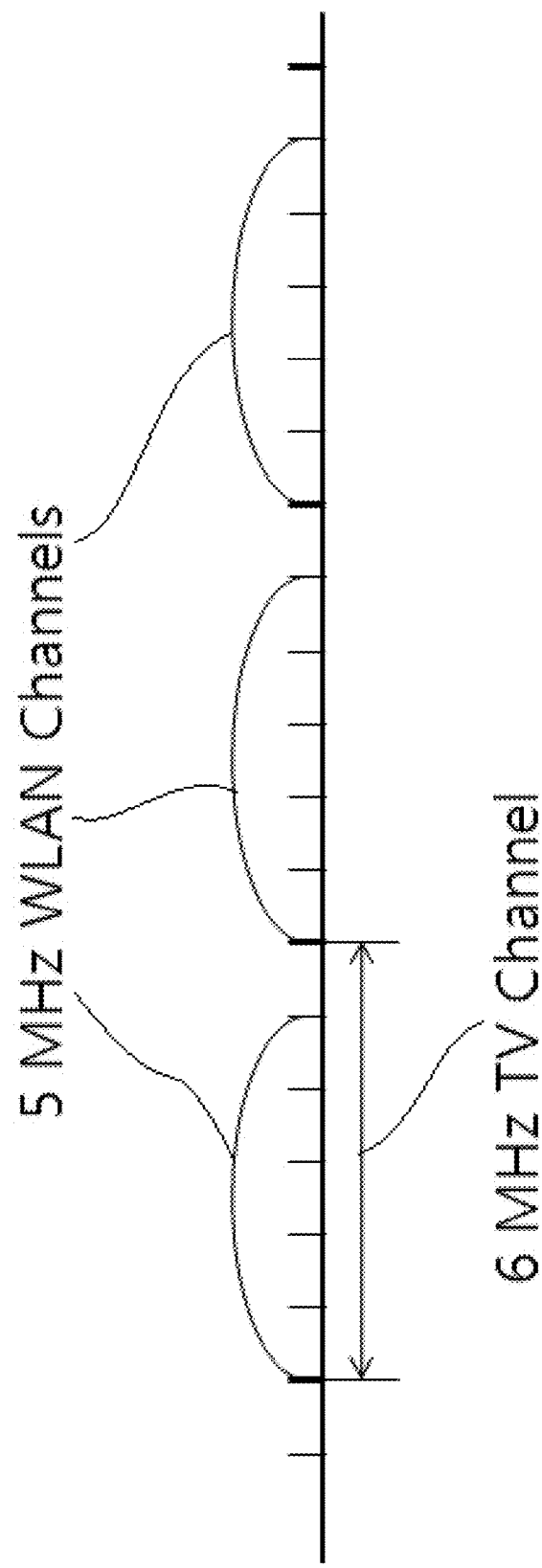
FIGS. 6 and 7 show examples for the channel granularity relationship between TV channel and WLAN channel.
Figure 7:
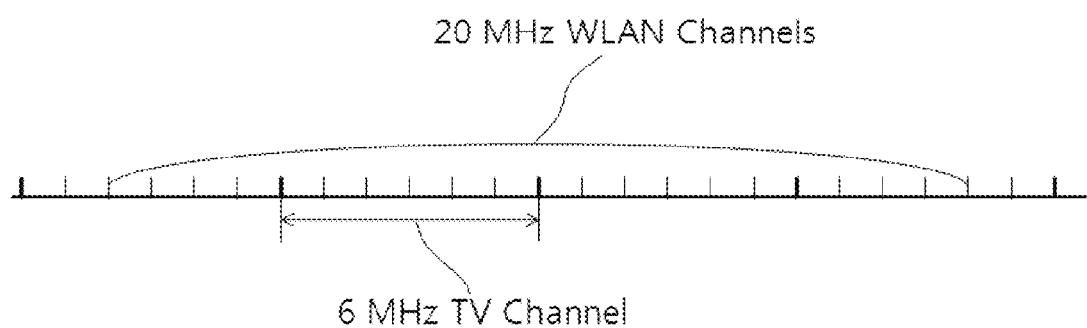

FIGS. 6 and 7 show examples for the channel granularity relationship between TV channel and WLAN channel.

As stated above, TV band database has available channel information with 6 MHz TV channel. Thus, if the WSM is designed to indicate available channel with 5 MHz (or 10/20/40 MHz) for WLAN operation, it may cost to modify the information already in the TV band database. Therefore, one example of the present invention propose the WSM indicating available TV channels with 6 MHz channel granularity, and the WLAN STA receiving the WSM and operating as an unlicensed device operates using 5 MHz (or 10/20/40 MHz) channel granularity. FIGS. 6 and 7 show examples for 5 MHz and 20 MHz channel granularities for WLAN operation, while the WSM indicates the available TV channels.

Figure 8:
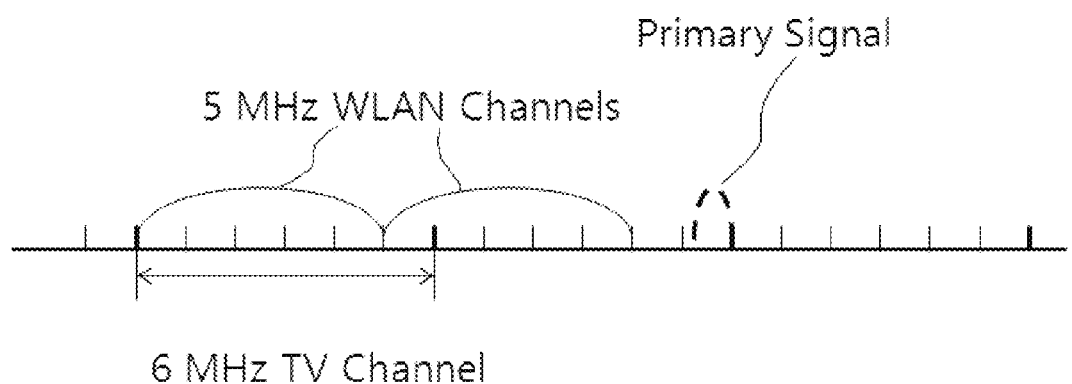
FIG. 8 shows a situation when a primary signal having a bandwidth less than 1 MHz is present, FIG. 9 schematically shows the passive scanning scheme according to one embodiment of the present invention, FIG. 10 schematically shows the active scanning scheme according to another embodiment of the present invention.

Further, even when we modifies the channel granularity from the TV band database, it is not efficient to design available channels with granularity of 5/10/20/40 MHz. Rather, one example of the present invention proposes to use smaller channel granularity, such as 1 MHz, for the WSM. FIG. 8 shows the benefit of this example.

There is a situation when a primary signal having a bandwidth less than 1 MHz (for example, microphone signal) is present as shown in FIG. 8. In this case, the whole of 6 MHz TV channel, within which the primary signal is detected or database may indicate that the 1 MHz is occupied by the primary signal, can be treated as unavailable. This can waist the frequency resource. However, if the WSM indicates available channel with 1 MHz channel granularity, 5 MHz WLAN channel can be established as shown in FIG. 8, thus, according to this example, we can efficiently use the available frequency resource.

Based on this, the scanning process according to one aspect of the present invention will be disclosed. In IEEE 802.11, there are two types of scanning process. One is a passive scanning process, and the other is an active scanning process. Two types of scanning processes according to one aspect of the present invention are explained.

Figure 9:
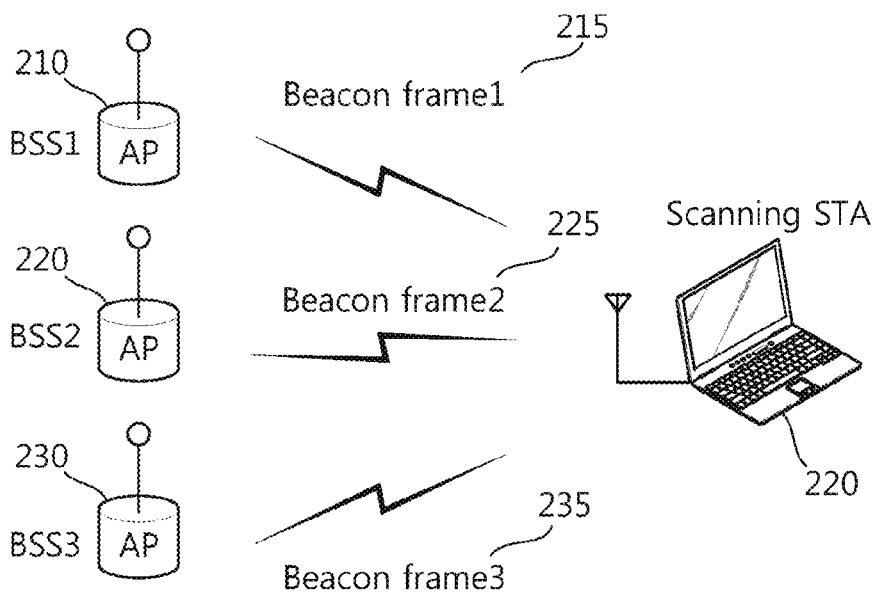

FIG. 9 schematically shows the passive scanning scheme according to one embodiment of the present invention.

In the passive scanning scheme, the scanning STA waits for a beacon frame while moving each channel on a channel list. The channel list specifies a list of channels that are examined when scanning for a BSS. In present embodiment, the list of channels to be examined is restricted to the available channel list identified by WSM to reduce the scanning time.

The beacon frame, one of management frames in IEEE 802.11, is periodically transmitted to inform about the presence of a wireless network, allow the scanning STA to search for the wireless network to join it. In an infrastructure network, an access point (AP) serves to periodically transmit the beacon frame.

When the scanning STA receives the beacon frame, it buffers the beacon frame to acquire information about a BSS, and records the beacon frame information in each channel while moving channels within the available channels identified by the received or acquired WSM.

With reference to FIG. 9, assume that a scanning STA 220 is a laptop computer equipped with IEEE 802.11 communication module. Also, assume that the scanning STA 220 operates as a non-AP STA, which was enabled and receives WSM comprising available channel list in TVWS from an enabling STA or an AP.

A scanning STA 220 performs channel scanning in a particular channel within the available channels according to the passive scanning scheme. If the scanning STA 220 receives a beacon frame 215 transmitted by an AP1 210 of a BSS1 and a beacon frame 225 transmitted by an AP2 220 of a BSS2, but not a beacon frame 235 transmitted by an AP3 230 of a BSS3, the scanning STA 220 performs buffering that the two BSSs (BSS1 and BSS2) have been discovered from a current channel and moves to another channel. Repeatedly performing this process, the scanning STA 220 performs scanning on every channel within the available channels identified by the WSM. Since, the scanning STA 220 needs not to perform scanning on channels identified as not available by WSM, the scanning time can be reduced significantly.

Figure 10:
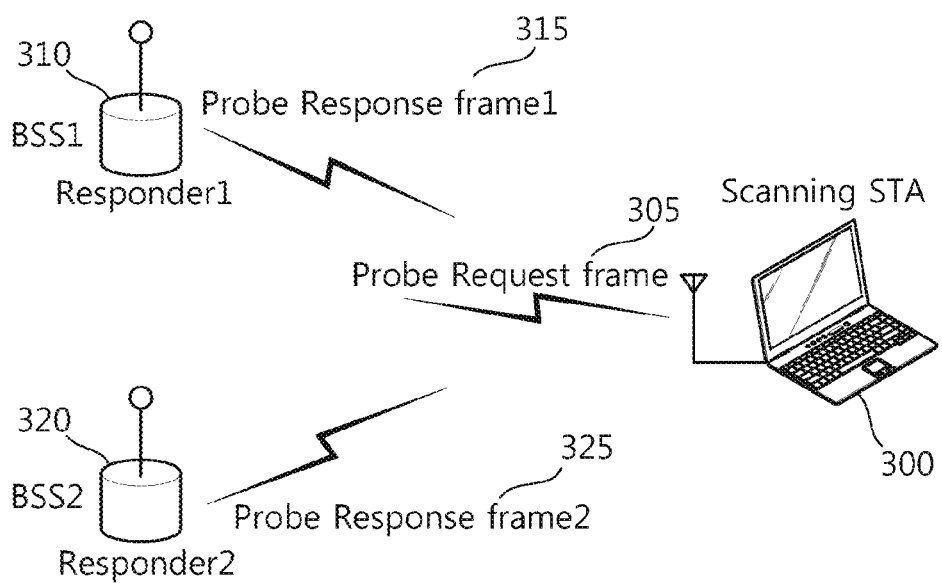

FIG. 10 schematically shows the active scanning scheme according to another embodiment of the present invention.

In the active scanning scheme, the scanning STA transmits a probe request frame, a management frame, transmitted to probe into an AP present nearby while moving each channel on the channel list, and waits for a pertinent response. In present embodiment, the channel list is restricted to the available channel list identified by WSM to reduce the scanning time.

In response to the probe request frame, a responder transmits a probe response frame to the scanning STA. Here, the responder refers to an STA which has finally transmitted a beacon frame in a BSS of a channel which was being scanned. In an infrastructure BSS, an AP transmits a beacon frame, so the AP can be the responder, while in an IBSS, STAs within the IBSS transmits a beacon frame by turns, so a responder can be not fixed.

With reference to FIG. 10, assume that a scanning STA 300 is a laptop computer equipped with IEEE 802.11 communication module. Also, assume that the scanning STA 300 operates as a non-AP STA, which was enabled and receives WSM comprising available channel list in TVWS from an enabling STA or an AP.

When a scanning STA 300 transmits a probe request frame 305, a first responder 310 of the BSS1 and a second responder 320 of the BSS2, which have listened to it, unicast a first probe response frame 315 and a second probe response frame 325 to the scanning STA 300, respectively. Upon receiving the first and second probe response frames 315 and 325, the scanning STA 300 buffers BSS-related information from the received probe response frames, moves to a next channel, and performs scanning on the next channel in the same manner. As stated above, since the scanning STA 300 needs not to perform scanning on channels identified as not available by WSM, the scanning time can be reduced significantly. The probe response frame may further comprise AP's capability information element, HT operation element, EDCA parameter set element, etc.

Figures 11, 12, 13:
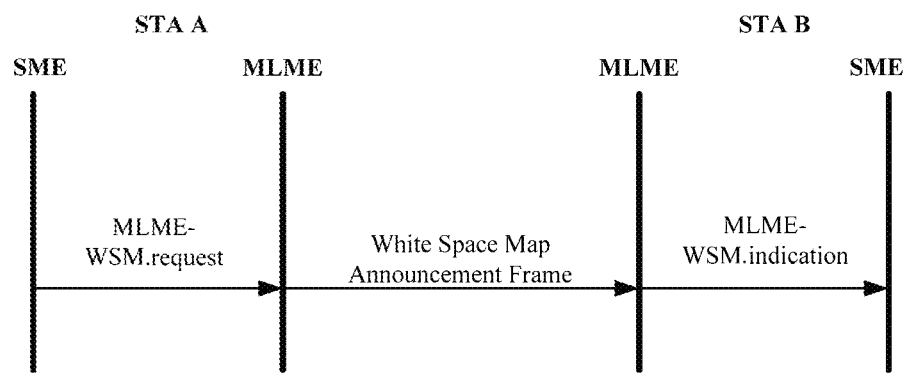
FIG. 11 shows another example of a proposed white space scanning mechanism of the present invention.
FIGS. 12 and 13 show an example of a White Space Map request management frame structure and a White Space Map response management frame structure, respectively.

FIGS. 11 and 12 show an example of a WSM request management frame structure and a WSM response management frame structure, respectively.

As shown in FIG. 11, the WSM request management frame may includes a Regulatory Class Element indicating a spectrum band for which the WSM is requested. By indicating the spectrum band using the Regulatory Class Element, the WSM request management frame can be used to request available channel information for a spectrum band not presently used by the non-AP STA. And, as shown in FIG. 12, the WSM response management frame may include a WSM Element indicating frequency information for available channels within the spectrum band indicated by the Regulatory Class Element of the WSM request management frame. The WSM may comprises one or more white space channel units, and each of the white space channel units comprises a channel number field indicating one of the available channels and a power constraint field indicating a maximum allowable power on the indicated channel. However, in another example of the present invention, the WSM may indicate the presence or the absence of the incumbent user.

Another aspect of the invention will be discussed.

AP STA shall update WSM, when there is a mismatch between the WSM from DB access and the report from any other STA, and when there is a channel identified as available by WSM, but this channel is used or scheduled to be used for TV broadcasting. And, one example of the present invention proposes the AP STA to transmit the updated WSM to non-AP STA(s), whenever the information from the regulatory domain database is updated, and the AP STA retrieves the updated available channel information from the DB. The AP STA can transmit the updated WSM via the above explained beacon frame or probe response frame.

Non-AP STA is proposed to transmit the updated WSM via White Space Map Announcement Frame, which will be explained below.

FIG. 13 shows a transmission mechanism of White Space Map announcement Frame between STAs according to one aspect of the present invention.

In FIG. 13, STA A and STA B may comprise SME (Station Management Entity) and MLME (MAC Layer Management Entity). First, SME of STA A may transmit MLME-WSM-.request to MLME of STA A. This primitive is for requesting MLME of STA to transmit White Space Map announcement frame to other STA. The MLME-WSM.request may comprise MAC address of STA B and (updated) WSM. MLME of STA A, receiving the MLME-WSM.request from SME, may generate White Space Map announcement frame, and transmit it to MLME of STA B. In this example, the White Space Map Announcement frame generated by MLME of STA A comprises (updated) WSM.

MLME of STA B, receiving White Space Map announcement frame comprising (updated) WSM from MLME of STA A, may indicate this to SME using MLME-WSM.indication. MLME-WSM.indication primitive may comprise MAC address of STA A and (updated) WSM. For the example for WSM update, where non-AP STA updates WSM, STA A is non-AP STA, thus MLME-WSM.indication may comprise address of non-AP STA MAC entity. SME of STA B, receiving MLME-WSM.indication, controls STA B to operate only within the available channels identified by the received WSM.

In summary, the STA can transmit (updated) WSM to a another STA via at least one of beacon frame, probe response frame, and White Space Map Announcement frame. When the STA is non-AP STA, the STA may transmit (updated) WSM via White Space Map Announcement frame.

As stated above, some embodiments of the present invention are for acquiring WSM using GAS protocol. Fur these embodiments, interworking service in WLAN system with a relation to the GAS protocol is explained.

The Interworking Service allows non-AP STAs to access services provided by an external network according to the subscription or other characteristics of that external network. An IEEE 802.11 non-AP STA may have a subscription relationship with an external network, e.g., with an SSPN (Subscription Service Provider Network).

An overview of the interworking functions addressed in this mechanism is provided below:

Network Discovery and Selection (Generic Advertisement Service (GAS))

Discovery of suitable networks through the advertisement of channel availability information, access network type, roaming consortium and venue information, via management frames Selection of a suitable IEEE 802.11 infrastructure using advertisement services (e.g., an IEEE 802.21 Information Server) in the BSS or in an external network reachable via the BSS Selection of an SSPN or External Network with its corresponding IEEE 802.11 infrastructure Emergency Services Emergency Call support QoS Map distribution SSPN Interface service between the AP and the SSPN More detailed information for this interworking mechanism is described in IEEE 802.11u Standard.

The Generic Advertisement Service (GAS) can be used by a STA to provide support for the network selection process and as a conduit for communication by a non-AP STA with other information resources in a network before joining the wireless LAN.

The Interworking Service supports Emergency Services (ES) by providing methods for users to access emergency services via the IEEE 802.11 infrastructure, advertising that emergency services are supported, and identifying that a traffic stream is used for emergency services.

The Interworking Service provides QoS mapping for SSPNs and other external networks. Since each SSPN or other external network may have its own layer-3 end-to-end packet marking practice (e.g., DSCP usage conventions), a means to re-map the layer-3 service levels to a common over-the-air service level is necessary. The QoS Map service provides STAs a mapping of network-layer QoS packet marking to over-the-air QoS frame marking (i.e., user priority).

The SSPN Interface service supports service provisioning and transfer of user permissions from the SSPN to the AP. The method and protocol by which these permissions are transferred from the SSPN are out of scope of this explanation.

One embodiment of the present invention proposes that non-AP STA uses the above explained GAS protocol to acquire the WSM information from the AP STA. A STA supporting GAS protocol can transmit an Interworking Element via a beacon frame or probe response frame. Advertisement Protocol IDs, which the STA supports, are transmitted via an Advertisement Protocol Information Element. This Advertisement Protocol Information Element can be transmitted via a beacon frame or a probe response frame.

FIGS. 14 and 15 show an example of the Advertisement Protocol Information Element format and Advertisement Protocol Tuplet format within the Advertisement Protocol Information Element format.

Element ID filed of the Advertisement Protocol Information Element indicates that the present IE is the Advertisement Protocol Information Element. As shown in FIG. 14, the Advertisement Protocol Information Element comprises a plurality of Advertisement Protocol Tuplets (e.g. Advertisement Protocol Tuplet #1, Advertisement Protocol Tuplet #2, . . . , Advertisement Protocol Tuplet #n in FIG. 14). Length field indicates the length of this IE.

Each of the Advertisement Protocol Tuplets within the Advertisement Protocol Information Element has a format as shown in FIG. 15.

Query Response Length Limit field of the Advertisement Protocol Tuplet indicates the maximum number of octets a STA will transmit in the Query Response field. Bit 7 of the Advertisement Protocol Tuplet indicates the Pre-Association Message Exchanging BSSID Independent (PAME-BI) bit, used by an AP to indicate whether the Advertisement Server, which is the non-AP STA's peer for this Advertisement Protocol, will return a Query Response which is independent of the BSSID used for the GAS frame exchange. Advertisement Protocol ID field of FIG. 15 indicates Advertisement Protocol ID the STA supports.

Figures 16, 17:
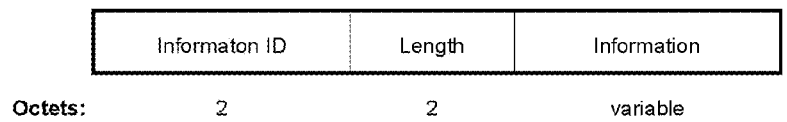

FIG. 16 shows an example of Advertisement Protocol IDs.

As shown in FIG. 16, when the value of the Advertisement Protocol ID field of the Advertisement Protocol Tuplet equals to 0, it indicates the STA supports Access Network Query Protocol (ANQP). In one embodiment of the present invention proposes non-AP STA to use ANQP to request WSM to the AP STA, and the AP STA responds to this request also using ANQP. Hereinafter, Access Network Query Protocol (ANQP) elements are explained.

FIG. 17 shows the format of Access Network Query Protocol (ANQP) element.

As shown in FIG. 17, Access Network Query Protocol (ANQP) elements are defined to have a common format consisting of a 2-octet Information ID field, a 2-octet length field, and a variable-length element-specific information field. Each element is assigned a unique Information ID as defined in this embodiment.

Each ANQP element is assigned a unique 2-octet Information ID. The set of valid Information IDs are defined in the following Table 1.

| Info Name | Info ID |
| --- | --- |
| Reserved | 0-255 |
| ANQP Capability list | 256 |
| Venue Name information | 257 |
| Emergency Call Number information | 258 |
| Network Authentication Type information | 259 |
| Roaming Consortium list | 260 |
| IP Address Type Availability information | 261 |
| NAI Realm list | 262 |
| 3GPP Cellular Network information | 263 |
| AP Geo Location | 264 |
| AP Civic Location | 265 |
| AP Location Public Identifier URI | 266 |
| Domain Name list | 267 |
| Emergency Alert Identifier URI | 268 |
| TDLS Discovery | 269 |
| White Space Access | 270 |
| Reserved | 271-56796 |
| Access Network Query Protocol vendor-specific list | 56797 |
| Reserved | 56798-65535 |

In this example of Table 1, Information ID of 270 indicates White Space Access, which will be further explained.

The Length field specifies the number of octets in the Information field. The ANQP elements that may be configured are shown in Table 1. If information is not configured for a particular ANQP element, then a query for that element will return that element with all optional fields not present.

The TVWS Access element provides a simple mechanism to exchange information with an external database for TVWS operation. The format of this element is provided in FIG. 18.

Figure 18:
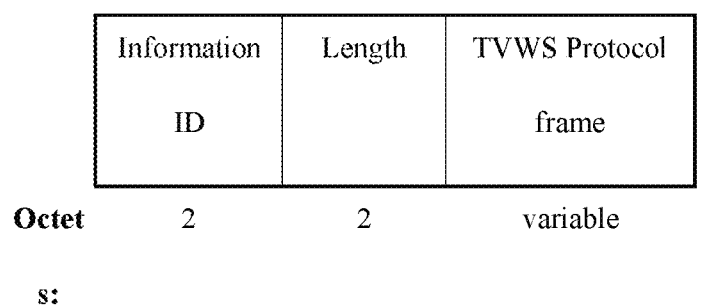
FIG. 18 shows the format of Access Network Query Protocol (ANQP) element.

FIG. 18 shows an example of TVWS Access format.

The Length field of TVWS Access is a 2-octet field and indicates the length of the TVWS Protocol frame. The TVWS Protocol frame is defined based on whether this TVWS Access is a TV band database request or a TV band database response.

To send TV band database requests to the TV band database, the TV Band Database Request frame is sent from the STA, using a TVWS Protocol frame as shown in FIG. 19.

FIG. 19 shows an example of TVWS (Regulatory) Protocol frame to be used for requesting the WSM to the Regulatory Database or geo-location data base.

The Location is a variable length field which contains a location report of the STA. As stated above, if an AP STA is requesting the WSM to the database, the AP STA uses this field to indicate its own geographical location. However, a STA may include location information of another STA. In this case, the requesting STA is requesting the WSM for another STA. Further, a STA may include location information for location in the future. That is, if the STA is scheduled to be located at a specific location at specific time, the STA may include location information for the specific time.

The Regulatory Database Address is a variable length field used to indicate a network address to which a database request can be sent, typically a URI formatted in accordance with RFC 3986. The Regulatory Access Time field is a variable octet length field used to request information at a future time. In consideration of forward compatibility, the database can be a different database other than TV band database. Thus, this Regulatory Database Address field can also be used to identify the type of the database.

As shown in FIG. 19, Location field, Regulatory database address field, and Regulatory access time field are optional. Further, the TVWS (Regulatory) Protocol frame may further comprise device identification information (not shown in FIG. 19). By using this device identification information together with the location information, non-AP STA can operate as an AP STA. Therefore, one example of the present invention propose a TVWS Protocol frame structure further including a length field to indicate the length of this frame.

On the other hand, the TV band (Regulatory) database response frame provides a list of identified available channels and its maximum allowed transmission power obtained from Regulatory database. The TV band (Regulatory) response frame returned in response to the TV Band (Regulatory) Database Request is shown in FIG. 20. One example of the WSM information element is shown in FIG. 21. The response may indicate a channel which has become unavailable by indicating the maximum transmission power as 0 watt.

TV band database access time is 8 octets in length and it indicates the TSF timestamp when a STA accesses TV bands database to get the TVWS Access information. Each White Space Channel Unit has the structure shown in FIG. 22.

FIG. 22 shows an example of a format for a White Space Channel Unit of the TV band database response frame.

The Channel Number field is 1 octet in length. The channel number describes where the TV channel is available for operation. As stated above, the channel number in this field indicates a TV channel, while WLAN STA operates on available WLAN channels within a range of identified available TV channels.

The Power Constraint contains the information necessary to allow a STA to determine the maximum transmit power in the channel within channel map pair. It indicates the maximum power, in dBm, allowed to be transmitted.

Hereinafter, a procedure for a STA to post a GAS query to an advertisement server is explained according to one example of the present invention.

Upon receipt of a GAS Initial Request frame, an MLME-GAS.indication primitive shall be issued to the STA's SME. Upon receipt of an MLME-GAS.response primitive, the STA shall transmit a GAS Initial Response frame to the requesting STA according to the following procedures.

If the requesting STA is in the associated state and in the power-save mode, the responding STA shall buffer the frame for transmission; otherwise the STA shall queue the frame for transmission.

a) If the Advertisement Protocol ID in the Advertisement Protocol element does not equal the value contained in any of available GAS Advertisement IDs (hereinafter called as "dot11GASAdvertisementID MIB object"), then the STA shall not post the query to an Advertisement Server. The STA shall transmit a directed GAS Initial Response frame to the requesting STA containing a dialog token whose value is identical to the dialog token in the GAS Initial Request frame, a Status Code equal to "GAS Advertisement Protocol not supported" (see Table 3), an Advertisement Protocol element containing the Advertisement Protocol ID used in the GAS Initial Request frame and a Comeback Delay and Query Response Length both set to 0.

b) If the query request corresponds to an Advertisement Protocol whose server is currently unreachable, the responding STA shall transmit a directed GAS Initial Response frame to the requesting STA containing a dialog token whose value is identical to the dialog token in the GAS Initial Request frame, a Status Code equal to "Advertisement Server in the network is not currently reachable", an Advertisement Protocol element containing an Advertisement Protocol ID equal to the Advertisement Protocol ID contained in the GAS Initial Request frame and a Comeback Delay and Query Response Length both set to 0. A STA receiving a status code indicating the Advertisement Server is unreachable should wait at least 1 minute before transmitting any further queries using the same Advertisement Protocol ID to the responding STA.

c) If the Advertisement Protocol ID in the Advertisement Protocol element equals the value contained in any dot11GASAdvertisementID MIB object, then the STA shall initialize a timer, referred to as the PostReplyTimer, to the value in dot11GASResponseTimeout MIB object and post the query to the Advertisement Server identified by the Advertisement Protocol ID.

TABLE 3

| StatusCode | ResultCode |
|---|---|
| 59 | ADVERTISEMENT_PROTOCOL_NOT_SUPPORTED |
| 60 | NO_OUTSTANDING_REQUEST |
| 61 | RESPONSE_NOT_RECEIVED_FROM_SERVER |
| 62 | TIMEOUT |
| 63 | QUERY_RESPONSE_TOO_LARGE |
| 64 | SERVER_UNREACHABLE |
| 65 | REQUEST_INFO_NOT_AVAILABLE |
| 66 | TRANSMISSION_FAILURE |
| 67 | RESPONSE_INFO_OF_LIMITED_TIME_VALUE |

Hereinafter, Access Network Query Protocol (ANQP) procedure according to one example of the present invention is explained.

A STA may use ANQP to retrieve information as defined in Table 1 from a peer STA. A STA accomplishes this by transmitting one or more ANQP Info IDs or ANQP vendor-specific query elements in the Query Request field in a GAS Initial Request frame. In the Query, Info IDs and vendor-specific query elements, if present, shall be ordered by non-decreasing Info ID. The ANQP Query Response comprises of ANQP elements shown in Table 1 and shall be ordered by non-decreasing Info ID. If information is not available for a particular ANQP element, then a query for that element will return that element with all optional fields not present.

ANQP frame usage for Infrastructure BSSs and IBSSs shall be in accordance with Table 4. Frame usage defines the entities permitted to transmit and receive particular ANQP elements. When dot11InterworkingServiceEnabled is true, STAs shall be capable of requesting the ANQP Capability list and returning the ANQP Capability list in an ANQP GAS message exchange; support for all other ANQP elements is optional.

TABLE 4

| Info Name | BSS AP | Non-AP STA | IBSS STA |
|---|---|---|---|
| ANQP Capability list | T, R | T, R | T, R |
| Venue Name information | T | R | — |
| Emergency Call Number information | T | R | — |
| Network Authentication Type information | T | R | — |
| Roaming Consortium list | T | R | — |
| Access Network Query Protocol vendor-specific list | T, R | T, R | T, R |
| IP Address Type Availability information | T, R | T, R | T, R |
| NAI Realm list | T | R | T, R |
| 3GPP Cellular Network information | T | R | — |
| AP Geo Location | T | R | T, R |
| AP Civic Location | T | R | T, R |
| The AP Location Public Identifier URI | T | R | T, R |
| Domain Name list | T | R | — |
| Emergency Alert Identifier URI | T | R | T, R |
| TDLS Discovery | T | R | T, R |
| TVWS Access | T | R | T, R |

Symbols
T
R
—

In Table 4, symbol 'T' indicates ANQP element may be transmitted by MAC entity. Symbol 'R' indicates ANQP element may be received by MAC entity. And, symbol '---' indicates ANQP element is neither transmitted nor received by MAC entity.

A STA that encounters an unknown or reserved ANQP Info ID value in a GAS frame received without error shall ignore that ANQP Info ID and shall parse any remaining ANQP Info IDs.

A STA that encounters an unknown vendor-specific OI field or subfield in a GAS frame received without error shall ignore that field or subfield respectively, and shall parse any remaining fields or subfields for additional information with recognizable field or subfield values.

Using the above explained ANQP, non-AP STA can retrieve the WSM information through AP STA, where AP STA has the capability to acquire the WSM information also using ANQP. Hereinafter, apparatuses for these non-AP STA and AP STA are briefly explained.

Figure 23:
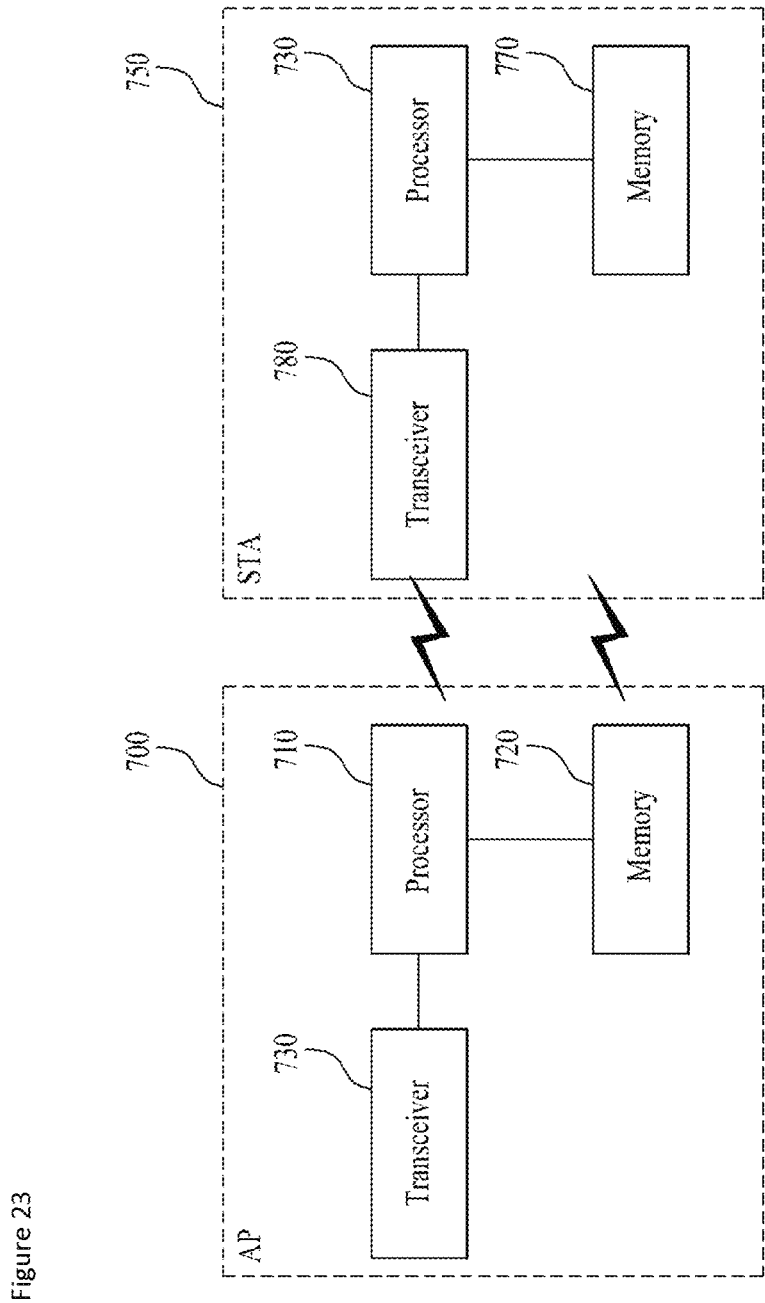
FIG. 23 is a schematic block diagram of wireless apparatuses implementing exemplary embodiments of the present invention.

FIG. 23 is a schematic block diagram of wireless apparatuses implementing exemplary embodiments of the present invention.

An AP 700 can include a processor 710, a memory 720, a transceiver 730, and a STA 750 may include a processor 760, a memory 770, and a transceiver 780. The transceivers 730 and 780 transmit/receive a radio signal and implement an IEEE 802 physical layer, and can be separated as transmitters and receivers. The processors 710 and 760 are connected with the transceivers 730 and 760 to implement an IEEE 802 physical layer and/or MAC layer. The processors 710 and 760 may implement the above-described channel scanning method.

The processors 710 and 760 and/or the transceivers 730 and 780 may include an application-specific integrated circuit (ASIC), a different chip set, a logical circuit, and/or a data processing unit. The memories 720 and 770 may include a read-only memory (ROM), a random access memory (RAM), a flash memory, a memory card, a storage medium, and/or any other storage units. When exemplary embodiments are implemented by software, the above-described scheme may be implemented as a module (process, function, etc.) performing the above-described functions. The module may be stored in the memories 720 and 770 and executed by the processors 710 and 760. The memories 720 and 770 may be disposed within or outside the processors 710 and 760 and connected with the processors 710 and 760 via well-known means.

Among these elements of apparatuses for AP/STA, the structure of processor 710 or 760 will be more specifically explained.

Figure 24:
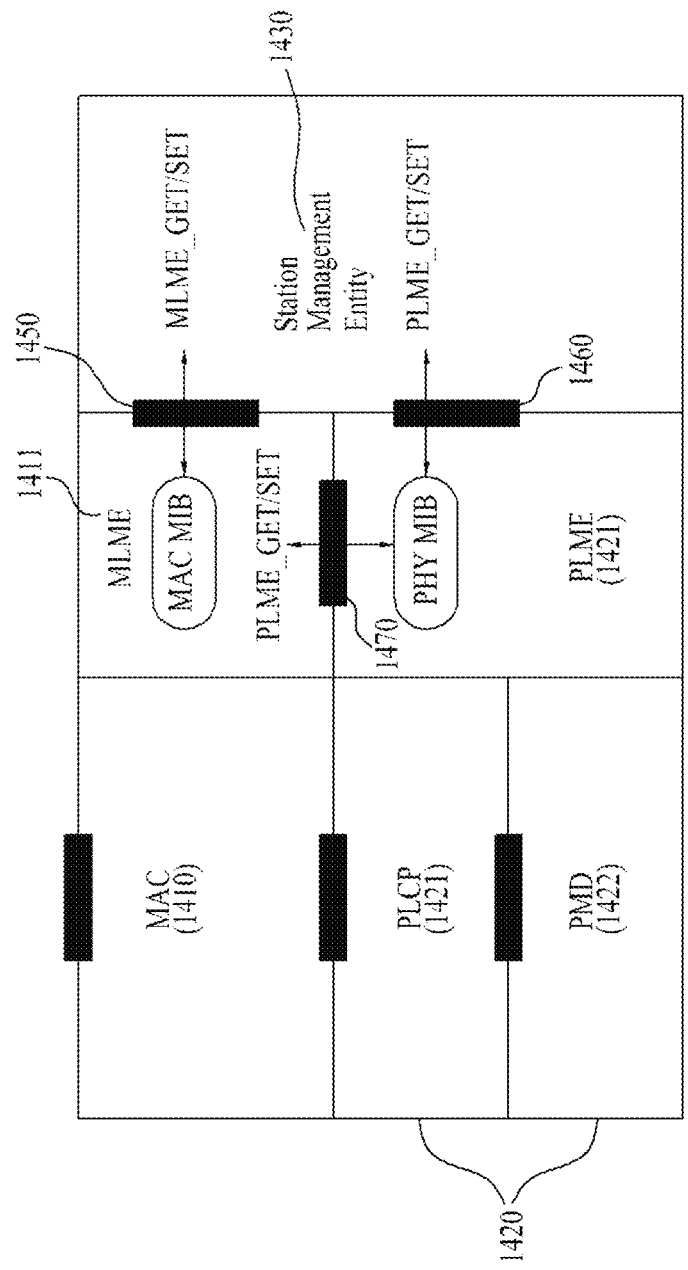
FIG. 24 shows an exemplary structure of processor of STA apparatus according to one embodiment of the present invention.

FIG. 24 shows an exemplary structure of processor of STA apparatus according to one embodiment of the present invention.

Processor 710 or 760 of STA may have multiple layer structures, and FIG. 24 especially focuses on MAC sublayer (1410) on data link layer (DLL) and Physical layer (1420) among these layers. As shown in FIG. 24, PHY (1420) may include PLCP entity (physical layer convergence procedure entity; 1421) and PMD entity (physical medium dependent entity; 1422). Both the MAC sublayer (1410) and PHY (1420) conceptually include management entities, called MLME (MAC sublayer Management Entity; 1411) and PLME (physical layer management entity; 1421), respectively. These entities (1411, 1421) provide the layer management service interfaces through which layer management functions can be invoked.

In order to provide correct MAC operation, an SME (Station Management Entity; 1430) is present within each STA. The SME (1430) is a layer independent entity that can be viewed as residing in a separate management plane or as residing "off to the side." The exact functions of the SME (1430) are not specified in this document, but in general this entity (1430) can be viewed as being responsible for such functions as the gathering of layer-dependent status from the various layer management entities (LMEs), and similarly setting the value of layer-specific parameters. SME (1430) would typically perform such functions on behalf of general system management entities and would implement standard management protocols.

The various entities within FIG. 24 interact in various ways. FIG. 24 shows some examples of exchanging GET/SET primitives. XX-GET.request primitive is used for requesting the value of the given MIBattribute (management information base attribute). XX-GET.confirm primitive is used for returning the appropriate MIB attribute value if status="success," otherwise returning an error indication in the Status field. XX-SET.request primitive is used for requesting that the indicated MIB attribute be set to the given value. If this MIB attribute implies a specific action, then this requests that the action be performed. And, XX-SET.confirm primitive is used such that, if status="success," this confirms that the indicated MIB attribute was set to the requested value, otherwise it returns an error condition in status field. If this MIB attribute implies a specific action, then this confirms that the action was performed.

As shown in FIG. 24, MLME (1411) and SME (1430) may exchange various MLME_GET/SET primitives via MLME_SAP (1450). According to one example of the present invention, upon receipt of a GAS Initial Request frame, an MLME-GAS.indication primitive shall be issued to the STA's SME (1430). Upon receipt of an MLME-GAS.response primitive, the STA shall transmit a GAS Initial Response frame to the requesting STA.

Also, as shown in FIG. 24, various PLCM_GET/SET primitives may be exchanged between PLME (1421) and SME (1430) via PLME_SAP (1460), and between MLME (1411) and PLME (1470) via MLME-PLME_SAP (1470).

WSM element of one example of the present invention can be transmitted by the sequential procedures of MAC (1410) and PHY (1420). Also, WSM element of one example of the present invention can be received by the sequential procedures of PHY (1420) and MAC (1410).

Although the examples and embodiments of the present invention have been disclosed in view of each aspect of the invention, those skilled in the art will appreciate that examples and embodiments of each aspect of the invention can be incorporated. And, there can be advantages not explicitly discussed, since they are obvious from the description for those skilled in the art.

What is claimed is:

1. A method for performing procedures for interworking with external networks in a wireless local area network (WLAN), the method comprising:
    transmitting, by a first station to a second station, an advertisement protocol element indicating support for a specific generic advertisement service (GAS) protocol;
    receiving, by the first station from the second station, request for requesting channel availability information including a GAS protocol element;
    accessing, by the first station, a database to obtain information on available frequencies;
    and transmitting, by the first station to the second station, a response including the channel availability information,
    wherein the GAS protocol element is used by the first station and the second station, before the second station is associated with the WLAN; and
    transmitting, by the first station to the second station, an enabling signal;
    receiving, by the first station from the second station, an enablement request frame; and
    transmitting, by the first station to the second station, an enablement response frame, wherein the enablement response frame includes a White Space Map (WSM).

2. The method of claim 1, wherein the GAS protocol element includes an info ID field indicating whether the GAS protocol element is related to the channel availability information or not.

3. The method of claim 1, wherein:
    the request frame is a GAS initial request frame; and
    the response frame is a GAS initial response frame.

4. The method of claim 1, wherein the response includes a GAS protocol element including the white space map (WSM) including the information on the available frequencies.

5. The method of claim 4, wherein the database provides a list of available channels for the location of the first station or the second station.

6. The method of claim 5, wherein the WSM includes information on the available frequencies for a location of the first station or the second station.

7. The method of claim 1, wherein:
    the first station is an enabling station; and
    the second station is a dependent station.

8. A method for performing procedures for interworking with external networks in a wireless local area network (WLAN), the method comprising:
    receiving, by a second station from a first station, an advertisement protocol element indicating support for a specific generic advertisement service (GAS) protocol;
    transmitting, by the second station to the first station, request for requesting channel availability information including a GAS protocol element;
    and receiving, by the second station from the first station, a response including the channel availability information,
    wherein the first station accesses a database to obtain information on available frequencies, and wherein the GAS protocol element is used by the first station and the second station, before the second station is associated with the WLAN; and
    transmitting, by the first station to the second station, an enabling signal;
    receiving, by the first station from the second station, an enablement request frame; and
    transmitting, by the first station to the second station, an enablement response frame, wherein the enablement response frame includes a White Space Map (WSM).

9. An apparatus of a first station for performing procedures for interworking with external networks in a wireless local area network (WLAN), the apparatus comprising:
    a transceiver; and
    a processor operably connected to the transceiver and configured to:
        transmit, to a second station, an advertisement protocol element indicating support for a specific generic advertisement service (GAS) protocol;
        receive, from the second station, request for requesting channel availability information including a GAS protocol element;
        access a database to obtain information on available frequencies; and
        transmit, by the first station to the second station, a response including the channel availability information,
    wherein the GAS protocol element is used by the first station and the second station, before the second station is associated with the WLAN; and
    transmit, by the first station to the second station, an enabling signal;
    receive, by the first station from the second station, an enablement request frame; and
    transmit, by the first station to the second station, an enablement response frame,
    wherein the enablement response frame includes a White Space Map (WSM).

10. An apparatus of a second station for performing procedures for interworking with external networks in a wireless local area network (WLAN), the apparatus comprising:
    a transceiver; and
    a processor operably connected to the transceiver and configured to:
    receive, from a first station, an advertisement protocol element indicating support for a specific generic advertisement service (GAS) protocol;
    transmit, to the first station, a request for requesting channel availability information including a GAS protocol element; and
    receive, from the first station, a response including the channel availability information,
    wherein the first station accesses a database to obtain information on available frequencies,
    wherein the GAS protocol element is used by the first station and the second station, before the second station is associated with the WLAN; and
    transmit, by the first station to the second station, an enabling signal;
    receive, by the first station from the second station, an enablement request frame; and transmit, by the first station to the second station, an enablement response frame, wherein the enablement response frame includes a White Space Map (WSM).

\* \* \* \* \*